US012706906B2

(12) United States Patent
Hay et al.

(10) Patent No.: US 12,706,906 B2
(45) Date of Patent: Aug. 11, 2026

(54) SYSTEMS AND METHODS FOR USE IN BIOMETRIC-ENABLED NETWORK INTERACTIONS

(71) Applicant: MASTERCARD INTERNATIONAL INCORPORATED, Purchase, NY (US)

(72) Inventors: Florent Hay, Laeken (BE); Bheemeswara Ankathi, Chesterfield, MO (US); Charl Frederik Botes, Parrish, FL (US); Ji Eun Cha, New York, NY (US); Qing Cao, Purchase, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 7 days.

(21) Appl. No.: 18/952,426

(22) Filed: Nov. 19, 2024

(65) Prior Publication Data

US 2026/0142973 A1 May 21, 2026

(51) Int. Cl.
*H04L 9/40* (2022.01)

(52) U.S. Cl.
CPC ................................ *H04L 63/0861* (2013.01)

(58) Field of Classification Search
CPC .................................................. H04L 63/0861
See application file for complete search history.

(56) References Cited

U.S. PATENT DOCUMENTS

2017/0357967 A1* 12/2017 Sykora .................. H04L 63/083
2018/0341759 A1* 11/2018 Sato ...................... G06F 21/608
2018/0341763 A1* 11/2018 Park ........................ G06F 21/42
2020/0045046 A1 2/2020 Nowak et al.
2020/0145219 A1* 5/2020 Sebastian .................. H04L 9/50
2021/0241266 A1 8/2021 Kamal et al.
2023/0095285 A1 3/2023 Abouelenin et al.
2024/0005328 A1 1/2024 Smets et al.
2024/0187223 A1 6/2024 Griffin
2024/0362622 A1* 10/2024 Law ..................... G06Q 20/385
2025/0202882 A1* 6/2025 Griffin-Allwood .......................... H04L 63/0435
2025/0392465 A1* 12/2025 Tuneld .................... G06F 21/31

* cited by examiner

*Primary Examiner* — Darren B Schwartz
(74) *Attorney, Agent, or Firm* — Harness, Dickey & Pierce, P.L.C.

(57) ABSTRACT

Systems and methods are provided for facilitating network interactions based on user biometrics. One example computer-implemented method includes receiving, from a directory server, a biometric service provider (BSP) assertion having a signature computed using a private key of a BSP, where the BSP assertion includes a biometric ID of a user, and verifying the signature of the BSP assertion using a public key specific to the BSP previously shared with the computing device. The method also includes returning a verification result to the directory server, receiving an access token based on the verification result, and then receiving an authentication creation request from a device specific to the user, which includes the access token. The method further includes determining that the access token is unexpired, providing a challenge to the device, and receiving, from the device, a signed challenge response.

20 Claims, 8 Drawing Sheets

SYSTEMS AND METHODS FOR USE IN BIOMETRIC-ENABLED NETWORK INTERACTIONS

FIELD

The present disclosure generally relates to systems and methods for use in biometric-enabled network interactions (e.g., for facilitating such interactions, etc.), with assurances for the interactions from passkey authentication.

BACKGROUND

This section provides background information related to the present disclosure which is not necessarily prior art.

Users are known to initiate interactions with parties in various manners. For example, a user (e.g., a consumer, etc.) may present a physical card, or other device, to a first party, to initiate payment from an account associated therewith to purchase a good or service from the first party. The card or other device is tied to the account, whereby associated information is delivered from the card or other device (e.g., an account number, etc.) to the first party to initiate the payment to purchase the good or service.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When users interact with first parties to purchase products (e.g., goods, services, etc.), the users may pay for the products through one or more accounts. In doing so, the users present cards or other devices (e.g., digital wallets, etc.) to first parties (e.g., merchants, etc.) in order to present credentials indicative of the accounts to fund the purchases to the first parties. Such presentment of credentials, though, may be cumbersome for both the users and the first parties, depending on the number of users purchasing products, the manners of presenting the credentials, the types and usability of required devices, etc. With biometric as an alternative, enrollment for biometric pay, however, may also be cumbersome in the individualized enrollment of merchants, and the necessary to provide assurances of legitimate enrollment. In some instances, such assurances may be inadequate, where the potential for unauthorized parties, inadequate verification, and forms of fraud still remain a technical barrier to the adoption of the biometric pay, as does friction associated with extension of enrollment for biometric pay to other first parties (e.g., enrolling separately with each one, etc.). That said, a technical solution is contemplated by the inventors hereof to such problem(s).

Uniquely, the systems and methods herein rely on identity and verification processes to enable passkey authentication, which is leveraged, in turn, to extend biometric interactions to authorized first parties.

Figure 1:
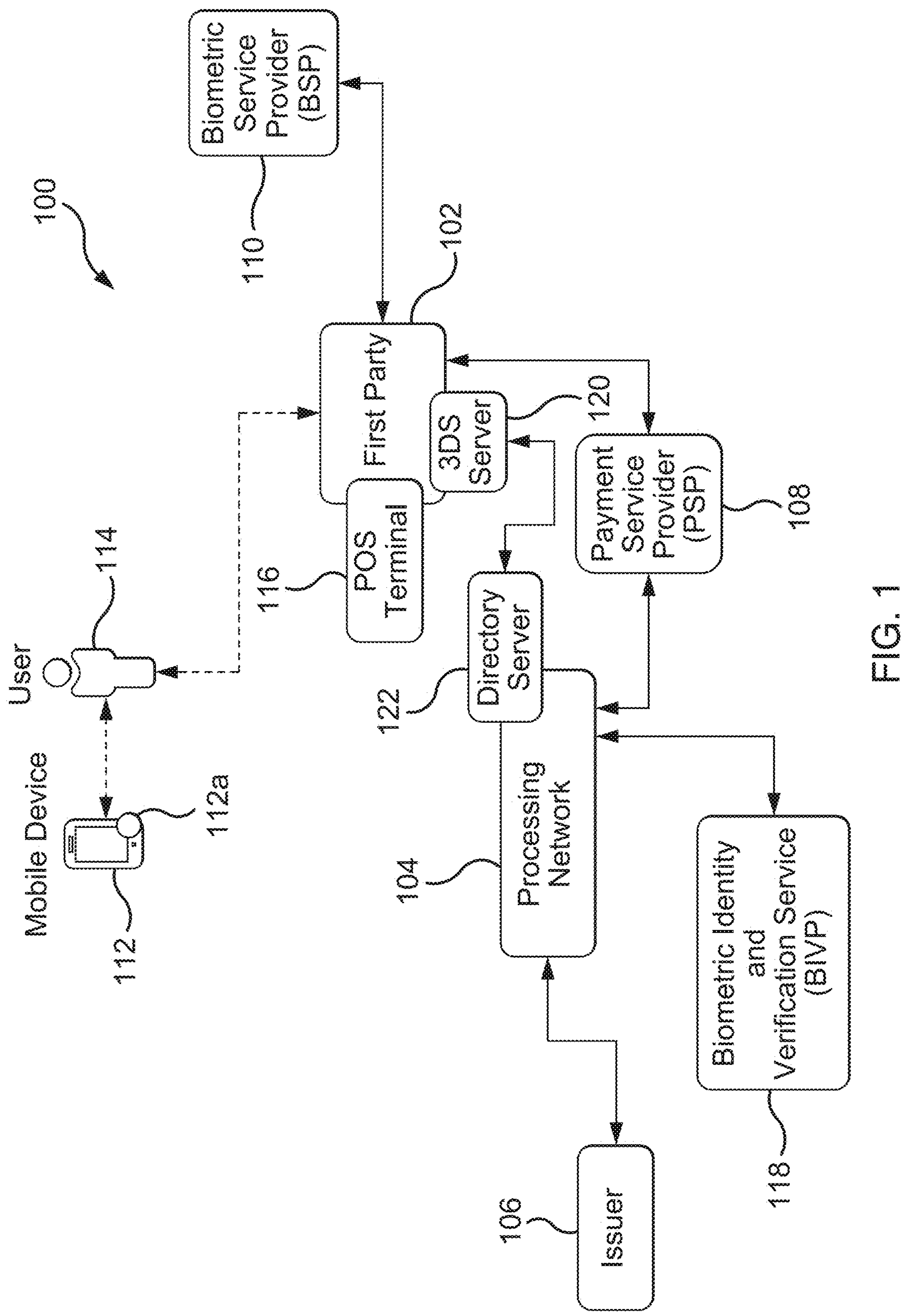
FIG. 1 illustrates an example system of the present disclosure suitable for use in facilitating biometric-enabled network interactions.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between first parties/merchant(s) and/or payment network(s) in the system 100, types and/or features of cards or other devices employed in the system 100, etc.

As shown in FIG. 1, the illustrated system 100 generally includes a first party 102, a processing network 104, an issuer 106, a payment service provider (PSP) 108 associated with the first party 102, and a biometric service provider (BSP) 110, each of which is coupled to (and is in communication with) one or more network(s) (as indicated by the arrowed lines in FIG. 1). The one or more network(s) may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, one network may include a private payment network made accessible by the processing network 104 to the issuer 106 and, separately, the public Internet, which may provide interconnection between one or more of the first party 102 and a communication device 112 associated with a user 114, etc.

The first party 102 of the illustrated system 100, in general, offers products (e.g., goods, services, etc.) for sale and/or sells products to users, including the user 114 (whereby, in this example, the first party 102 may be a merchant, etc.). In this example embodiment, the first party 102 includes either a brick-and-mortar store (e.g., a physical store location, etc.) or a virtual merchant location, such as, for example, a website, network-enabled application, etc. In either instance, the first party 102 permits, through the location, the user 114, for example, to browse products and to purchase products.

As shown in FIG. 1, the first party 102 includes a point-of-sale (POS) terminal 116 which, among other things, is configured to compile and transmit authorization messages for interactions funding the purchase of products from the first party 102. While FIG. 1 includes a POS terminal 116 that is generally disposed at the first party 102, the POS 116 may be embodied in a website or other network communication enabled application to interact with the user 114 in connection with an interaction. Further, the POS terminal 116 also includes, or in this embodiment is connected to, a biometric capturing device (not shown). The biometric capturing device may include, for example, a camera (e.g., a camera device capable of taking a biometric scan of a face, a hand, a finger, a palm, etc.), a fingerprint, palm or retina scanner, etc. The biometric capturing device may be included physically within, at least partially, the POS terminal 116, or may be separate therefrom, or connected (wired, wirelessly, etc.) to the POS terminal 116, etc.

It should be understood that in certain embodiments, the biometric capturing device may be part of another computing device (e.g., device 112, etc.) configured to capture a biometric, which may then be passed to the first party 102 (e.g., mobile device 112 in an e-commerce interaction, etc.).

Further, the first party 102 is associated with the PSP 108. The PSP 108 is configured to enable the first party 102 to accept electronic payments for products. It should be understood, for example, that the PSP 108 is configured to communicate with the processing network 104, in this example embodiment, and also, financial institutions, such as, for example, an acquirer associated with the first party, as an intermediate between the first party 102 and the processing network 104 and/or the acquirer. In addition in the illustrated system 100, the issuer 106 is associated with the user 114, and configured to issue an account (e.g., a debit account, a credit account, a prepaid account, a checking account, etc.) to the user 114 to use in funding interactions, including with the first party 102.

With continued reference to FIG. 1, the processing network 104 may be employed for purposes of authentication and authorization.

In particular, in this example, the processing network 104 is configured consistent with one or more enhanced authentication schemes, such as, for example, the EMV 3DS protocol (see, e.g., https://www.emvco.com/emv-technologies/3d-secure/(which is incorporated herein by reference), etc.). In particular, as shown, the processing network 104 includes a 3DS server 120 and a directory server 122. The 3DS server 120 is incorporated in and/or associated with the first party 102, whereby reference herein to the first party 102 and the 3DS server 120 may be interchangeable, except where explicitly distinct. The directory server 122 is associated, in this example, with the processing network 104 (e.g., MASTERCARD, VISA, etc. associated networks) and is configured as described below. It should be appreciated that the processing network 104 may further include an access control server (ACS) (not shown), which is incorporated in and/or is part of the issuer 108.

In addition, while the 3DS server 120 is associated with the processing network 104, the 3DS server 120 may reside, as illustrated in FIG. 1, in full or in part, at/in the first party 102. Or, in other embodiments, the 3DS server 120 may reside, in full or in part, at/in the PSP 108 or elsewhere in the system 100.

Further, in this example embodiment, the 3DS server 120 and directory server 122 are configured to communication through, for example, a message extension field of the EMV 3DS protocol, or otherwise. It should be appreciated that another dedicated field in the EMV 3DS protocol may be employed in other embodiments. In still other embodiments, relevant communications, as describe below, may leverage one or more non-3DS protocols (e.g., application programming interfaces (APIs), etc.), etc.

In this example embodiment, the processing network 104 is further configured to coordinate messaging between the PSP 108 and the issuer 106 to provide authorization of interactions, whereby the user 114 funds the purchase of one or more products, by and between the account of the user 114 and an account of the first party 102 (e.g., issued by an acquirer (not shown), etc.). In this manner, the processing network 104 is configured to enable communication, via the ISO 8583 standard, or ISO 20022 standard, between the issuer 106 and the PSP 108, etc.

With continued reference to FIG. 1, the mobile device 112 is associated with the user 114 and may include any suitable device (e.g., a mobile device, another device, etc.). In this example embodiment, the device 112 is illustrated as a smartphone. That said, the device 112 may be a different device (either mobile or not) in other embodiments, including, for example, a laptop computing device, a tablet device, a smartwatch device, a desktop computing device, or other device, etc. As further shown in FIG. 1, the device 112 includes a wallet application **112*a*, which may be generally understood to be an electronic wallet, which configures the device 112 to be associated with accounts (e.g., payment accounts, etc.). The wallet application 112*a* may be associated with the issuer 108 (e.g., as a bank electronic wallet, etc.), the processing network 104, or another entity included in, or not in, the system 100. In at least one example, the wallet application 112*a* is specific to the device 112** (e.g., an APPLE PAY wallet of an APPLE device, SAMSUNG WALLET digital wallet for SAMSUNG devices, etc.).

It should be appreciated that the wallet application **112*a* is downloaded to and launched in the device 112, to configure the device 112** to perform one or more of the operations described herein.

With continued reference to FIG. 1, the user 114 desires to be enrolled in biometric-initiated pay with the first party 102 and potentially other first parties. In this way, the user 114 would be permitted to present a biometric, in lieu of a digital wallet, physical card, etc. to purchase product(s) from the one or more first parties through a designated payment account.

Based on the above, the first party 102 is associated with at least the BSP 110. The BSP 110 is configured to enable the first party 102 to participate in biometric-initiated transactions and further to participate in enrollment of users (e.g., the user 114, etc.) for biometric-initiated pay. What's more, in this example embodiment, the BSP 110 is configured to onboard itself with a biometric identification verification platform (BIVP) 118. In doing so, the BIVP 118 is configured to review, verify, and approve the BSP 110 to be onboarded (e.g., through various processes related to the trust, quality, security, privacy, etc., associated with biometric matching performances, security, etc.). In this way, the BSP 110 may be certified according to a biometric checkout certification process, as defined, for example, at an industry level. As part of onboarding, the BSP 110 is configured to generate a private-public key pair, based on one or more cryptographic algorithms, to store the private key in a memory thereof, and to share the public key and an identifier specific to the BSP 110, i.e., a BSP ID specific to the BSP 110, to/with the BIVP 118. Such keys may be referred to herein as the BSP private key and the BSP public key. The BIVP 118 is configured, in turn, to store the BSP public key along with the BSP ID in a memory, to be used to verify subsequent assertions from the BSP 110, as explained below.

That said, the BIVP 118, in this example embodiment, is configured to perform the operations related to biometric-initiated pay as described herein, and specifically, related to a list of authorized first parties for biometric-initiated pay for different users. Relatedly, the BIVP 118 may be a standalone party (e.g., an independent service, etc.). It should be appreciated that the BIVP 118 may be integrated in whole or in part in other parties/devices of FIG. 1. For example, the BIVP 118 may be integrated in the processing network 104 (e.g., in the directory server 122, etc.) in one or more embodiments. In one particular example, the BIVP 118 may be incorporated, in whole or in part, in the MASTERCARD ID Check network, which may be separate from, in communication with, or integrated, in whole or in part, with the MASTERCARD authorization network, etc.

Referring again to enrollment for biometric-initiated pay, for example, the user 114 decides to enroll for biometric-initiated pay at the first party 102, whereby the user 114 initiates an option to enroll through the device 112, via the application 112*a*.

In response to the initiation, the user 114 presents a biometric to the mobile device 112, and the device 112, as configured by the application 112*a*, captures the biometric of the user 114, for example, via a biometric capturing device of the device 112, etc. As part thereof, the device 112, as configured by the application 112*a*, performs one or more quality checks, such as, for example, a liveness check (e.g., for a facial biometric, etc.), a size check for the biometric, a clarity check of the biometric, etc. In response to the one or more quality checks being satisfied, the device 112, as configured by the application 112*a*, forwards the biometric to the BSP 110. As explained above, the biometric may include a facial image, fingerprint, palm print, or other suitable biometric, which may be raw data in some examples, or a biometric template generated by the device 112, in other examples.

The device 112, as configured by the application 112*a*, communicates the biometric to the BSP 110. The device 112 may be configured, by the application 112*a*, to communicate with the BSP 110, for example, through an API exposed by the BSP 110 and/or a software development kit (SDK) specific to the BSP 110, which is integrated with the application 112*a*. Alternatively, the device 112 may be configured, by the application 112*a*, to communicate with the BSP 108, through the first party 102, etc.

Upon receipt of the biometric, the BSP 110 may be configured to perform one or more biometric quality checks to ensure quality, sufficiency, etc. of the biometric and/or compliance with biometric standards of the BSP 110, etc. Upon successful completion of the quality check(s), the BSP 110 is configured to generate a biometric template from the biometric, to generate a unique biometric ID for the biometric and the user 114 (e.g., unique as to each other biometric known to the BSP 110, etc.), and to store (e.g., in memory associated with the BSP 110, etc.) the biometric template linked to the biometric ID as a biometric reference for the same. Also, in this example embodiment, the BSP 110 is configured to generate a BSP assertion for the biometric ID and to return the BSP assertion to the mobile device 112. The BSP assertion includes, among other things, the biometric ID, additional data related to the received biometric or user 114, etc., a BSP ID specific to the BSP 110, and a signature, using the private key of the BSP 110, i.e., the BSP private key.

In turn, the device 112, as configured by the wallet application 112*a*, solicits an account to be associated with the biometric, to enable biometric-initiated transactions.

In response, the user 114 selects an account, and the device 112, as configured by the wallet application 112*a*, initiates an identification and verification (ID&V) process with the issuer 106 of that account, whereby the issuer 108 is configured to solicit information sufficient from the user 114, via the device 112, to identify the user 114 and then to verify the identity of the user 114. In this example embodiment, in particular, the process is initiated through the PSP 108, whereby the device 112, as configured by the wallet application 112*a*, initiates the process with the PSP 108.

The PSP 108, in turn, is configured to submit a non-payment authentication request to the issuer 106, through the 3DS server 120 and the directory server 122 (e.g., an authentication request (AReq), etc.). In turn, the issuer 108 is configured to initiate a challenge to the user 114, which may include a one-time-passcode (OTP), biometric authentication performed in a mobile application (e.g., a banking application specific to the issuer 106, application 112*a*, etc.) at the mobile device 112, or other interaction between the user 114 and the issuer 106 (e.g., a push notification to the application 112*a*, texted link, phone call, etc.). When the issuer 106 has sufficiently identified and verified the identity of the user 114, an authentication result is retuned from the issuer 106 to the PSP 108, via the 3DS server 120 and the directory server 122.

In this example embodiment, the PSP 108 is configured to then initiate a binding request to the directory server 122, to bind the biometric ID to the card data for the selected account, which is based on the successful ID&V process. In connection therewith, the directory server 122 is configured to submit the BSP assertion, received from the device 112, via the PSP 108 and the 3DS server 120, to the BIVP 118. The BIVP 118 is configured, in turn, to verify the BSP assertion, by retrieving the public key for the BSP 108, i.e., the BSP public key, based on the BSP ID and verifying the private key signature on the BSP assertion. When verified, the BIVP 118 is configured to return the verified result to the directory server 122.

Based on the verified result, the directory server 122 is configured to map the card ID of the account selected by the user 114 to the biometric ID, thereby enabling the account for use through presentment of the biometric of the user 114. In addition, the directory server 122 is configured to generate a limited-time access token to enable the ID&V result (i.e., tracked based on transaction ID) to be used to setup passkey authentication of the user 114 at the device 112. The access token may expire, for example, in five minutes, ten minutes, thirty minutes, or more or less, etc. The directory server 122 is configured to share the access token with the BIVP 118, and to further provide the access token back to the device 112, through the 3DS server 120 and the PSP 108.

In turn, the device 112, as configured by the wallet application 112*a*, proceeds to submit the access token, as part of a passkey authentication creation request to the BIVP 118. The BIVP 118 is configured to verify that the access token is valid and unexpired and, when the access token is valid and unexpired, to return a challenge to the device 112. The device 112, as configured by the wallet application 112*a*, authenticates the user 114. That is, the device 112 is configured to authenticate the user 114, via a biometric, a PIN or otherwise. The device 112, in this example, is accessible to the user 114 based on authentication. For example, where the device 112 is a smartphone, the smartphone may require a biometric of the user 114 to be presented, or a PIN to be entered, which the smartphone verifies to permit access thereto. In this embodiment, the device 112 is configured, by the application 112, to authenticate the user 114 in a similar manner, and then, based on successful authentication, to generate a private-public key pair and a credential ID. Such keys may be referred to herein as the device private key and the device public key. The device 112 is configured, by the application 112*a*, to store the device private key in a secure location in the device 112 (e.g., a trusted platform module (TPM), a trusted execution element (TEE), a secure element (SE), etc.). In this manner, the device private key is unique, specific and private to the device 112 (and thus, unknown apart from the device 112).

The device 112, as configured by the application 112*a*, then signs the challenge with the device private key and returns the signed challenge, the device public key and the credential ID to the BIVP 118.

The BIVP 118 is configured to store the credential ID and to map the credential ID to the biometric ID.

In this way, the user 114 is enrolled in/for biometric-enabled interactions with the first party 102, based on specific assurances that the user 114 and the biometric are verified.

In this example embodiment, the device 112, as configured by the application 112*a*, further permits the user 114 to associate the biometric-initiated pay to different first parties, through use of the passkey authentication. That is, the user 114 may access the application 112 and select an option to enable one or more first parties for biometric-initiated pay. In turn, the device 112, as configured by the application 112*a*, solicits the selection of one or more first parties to enable for biometric-initiated pay. In response, the user 114 selects the first party 102.

When the device 112 is enabled for passkey authentication with the BIVP 118, the device 112 is configured, by the application 112*a*, to submit a request to activate the first party 102 for biometric-initiated pay to a list of authorized first parties to the BIVP 118. The request includes card details for the account and the merchant ID for the first party 102. In response, the BIVP 118 is configured to return a passkey challenge to the user 114, at the device 112. The device 112, as configured by the application, upon receipt, authenticates the user 114 (e.g., via biometric authentication, etc.).

The device 112, as configured by the application 112*a*, then retrieves the device private key and signs the passkey challenge with the device private key. The device 112, as configured by the application 112*a*, then returns the signed challenge, along with the merchant ID to the BIVP 118. The BIVP 118 is configured to verify the signature, with the device public key previously received from the device 112. When the signature is verified, the BIVP 118 is configured to add the merchant ID of the first party 102 to a list of authorized first parties for the device 112 and/or the user 114.

The BIVP 118 is configured to also confirm the addition of the first party 102 to the listed of authorized first parties for biometric-initiated transactions.

Based on the above, the first parties approved for biometric-initiated pay are included in the list of authorized first parties, by merchant ID, for the user 114. In this embodiment, the biometric-initiated pay is associated with the account selected above, whereby the enrolled biometric continues to be linked to the selected account for the newly linked first parties, through leveraging the passkey authentication in lieu of further ID&V processes per first party. It should be appreciated that the user 114 may add additional first parties to the list of authorized first parties for biometric-initiated pay in a similar manner.

Subsequently, in connection with a biometric-initiated pay interaction at the first party 102, the user 114 submits a biometric in lieu of a card or other device, etc., to the first party 102 to initiate a transaction. In turn, the first party 102 is configured to capture a biometric of the user 114, for example, via the POS terminal 116, or other suitable biometric capturing device, etc. The first party 102 is configured to perform one or more quality checks, such as, for example, a liveness check as the biometric is captured, etc. Upon successful quality check(s), the first party 102 is configured to submit the biometric to the BSP 110, for example, as a request to identify the user 114. Upon receipt of the request, the BSP 110 is configured to perform one or more quality checks on the biometric template, as describe above. Upon successful quality check(s), the BSP 110 is configured to match the biometric template to a biometric reference stored therein, in order to identify the corresponding biometric ID. In response to successfully identifying a biometric ID, the BSP 110 is further configured to compute an assertion (e.g., including the biometric ID and other suitable data) as the payload, to sign the assertion with the BSP private key, and to return the signed transaction assertion, to the first party 102. Again, the suitable data may include, without limitation, a biometric modality (e.g., palm, face, iris, etc.), a BSP ID, a wallet ID, a biometric enrollment timestamp (Epoch), a BSP transaction ID, a certification ID, and a compliance ID, etc.

It should be understood that where the quality check(s) or matching fail, the BSP 110 may be configured to request that the biometric capture be repeated.

The first party 102 is configured to retrieve and display card data for the account associated with the biometric ID. The first party 102 is further configured to receive a selection of one card, or account, from the user 114. The first party 102 is then configured to submit a checkout request to the PSP 108, which includes, without limitation, the biometric ID, the BSP assertion, the BSP ID, and transaction details, etc.

The PSP 108 is configured to submit a payment authentication request to the 3DS server 120. The authentication request includes, among other things, the account details, and the BSP assertion, etc.

The 3DS server 120, in turn, is configured to initiate a payment authentication request (AReq) with the directory server 122. The AReq includes, for example, a category 01 message, which includes the BSP assertion and other information, where the message is consistent with the EMV 3DS protocol. The AReq is designated to not flow to the issuer 108 (e.g., generateCReq=False, etc.).

The directory server 122 is configured to submit the BSP assertion to the BIVP 118. The BVIP 118, in turn, is configured to verify the signature on the BSP assertion with the BSP public key previously received from the BSP 110 (e.g., as identified by the BSP ID, etc.). Once verified, the BVIP 118 is configured to confirm the BSP assertion to the directory server 122. The directory server 122 is configured to confirm the first party 102 is authorized for biometric-initiated pay with the BIVP 118. In response, the BIVP 118 is configured to check the merchant ID of the first party 102 against the list of authorized first parties. When present, the BIVP 118 is configured to indicate an affirmative check (or authorization) to the directory server 122.

With the verification of the BSP assertion and the first party 102 being authorized, the directory server 122 is configured to generate a biometric authentication value, or BAV and to include the BAV along with the account details and an issuer authentication value (IAV), etc., in a communication to the PSP 108, through the 3DS server 120. In doing so, the PSP 108 is configured to compile and transmit an authorization request for the transaction to the processing network 104, via an acquirer (not shown), with the BAV as part of the 0100 message consistent with the ISO 8583 standard. Upon receipt of the authorization request, the processing network 104 is configured to validate the BAV. And, once validated, the processing network 104 is configured to transmit the authorization request to the issuer 106. Once the transaction is authorized, the issuer 106 is configured to compile and transmit an authorization response for the interaction back to the PSP 108, through the processing network 104.

The PSP 108, upon authorization in the authorization response, is configured to notify the first party 102 that the interaction is authorized. The first party 102 is configured to then proceed to deliver the product to the user 114 and/or to notify the user 114 of the authorization.

While only one first party 102, one issuer 106, one PSP 108, and one BSP 110 are illustrated in FIG. 1, it should be appreciated that any number of these parts and/or entities (and their associated components) may be included in the system 100, or may be included as a part of systems in other embodiments, consistent with the present disclosure. Likewise, it should be appreciated that the system 100 and/or other system embodiments will generally include multiple users, each associated with an account and a biometric for use in biometric-initiated payments interactions with the first parties, etc.

Figure 2:
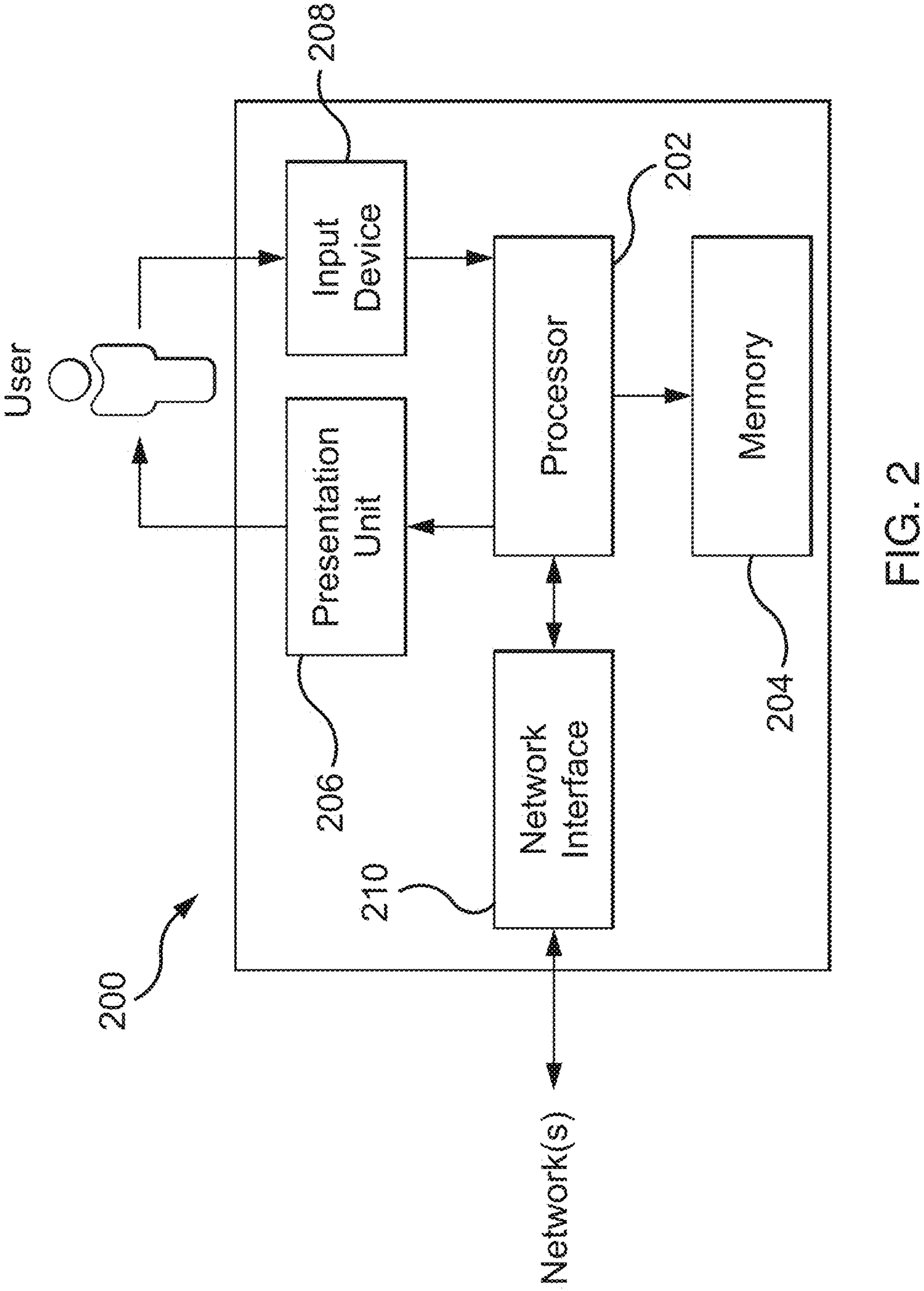
FIG. 2 is a block diagram of an example computing device that may be used in the system of FIG. 1.

FIG. 2 illustrates an example computing device 200 that may be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to operate as described herein. In the example embodiment of FIG. 1, each of the first party 102, the processing network 104, the issuer 106, the PSP 108, the BSP 110, the device 112, the POS terminal 116, the BIVP 118, the 3DS server 120, and the directory server 122 are understood to be included in, or as being generally implemented in, at least one computing device generally consistent with computing device 200, coupled to (and in communication with) the one or more networks. However, with that said, the system 100 should not be considered to be limited to the computing device 200, as described below, as different computing devices and/or arrangements of computing devices may be used.

Referring to FIG. 2, the example computing device 200 includes a processor 202 and a memory 204 coupled to (and in communication with) the processor 202. The processor 202 (as well as the processor 128) may include one or more processing units (e.g., in a multi-core configuration, etc.). For example, the processor 202 (as well as the processor 128) may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), flash drives, CD-ROMs, thumb drives, floppy disks, tapes, hard disks, and/or any other type of volatile or nonvolatile physical or tangible computer-readable media. The memory 204 may be configured to store, without limitation, biometric templates, biometrics IDs, list of authorized merchant IDs, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein, whereby such performance improves operation of the computing device (as described herein) and transforms the computing device 200 into a special-purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, such as indicators of successful authentications, audibly or visually, for example, to a user of the computing device 200, such as the user 114 in the system 100 (e.g., at the device 112, the POS terminal 116, etc.), etc. The presentation unit 206 may include, without limitation a liquid crystal display (LCD), a light-emitting diode (LED) or LED display, an organic LED (OLED) display, an "electronic ink" display, speakers, etc. In some embodiments, presentation unit 206 may include multiple devices.

In addition, the computing device 200 includes an input device 208 that receives inputs from the user of the computing device 200 (i.e., user inputs) such as, for example, biometric inputs, etc., as further described herein. The input device 208 may include a single input device or multiple input devices. The input device 208 is coupled to (and is in communication with) the processor 202 and may include, for example, a keyboard, a pointing device, a mouse, position sensors, biometric capturing device (e.g., fingerprint sensors, camera, palm reader, etc.) or any other type of sensor, a touch sensitive panel (e.g., a touch pad or a touch screen, etc.), another computing device, and/or an audio input device, etc. Further, in various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., Wi-Fi adapter, a near field communication (NFC) adapter, a Bluetooth adapter, etc.), a mobile network adapter, or other device capable of communicating to one or more different networks, including the one or more networks described above. Further, in some example embodiments, the computing device 200 may include the processor 202 and one or more network interfaces incorporated into or with the processor 202.

Figure 3:
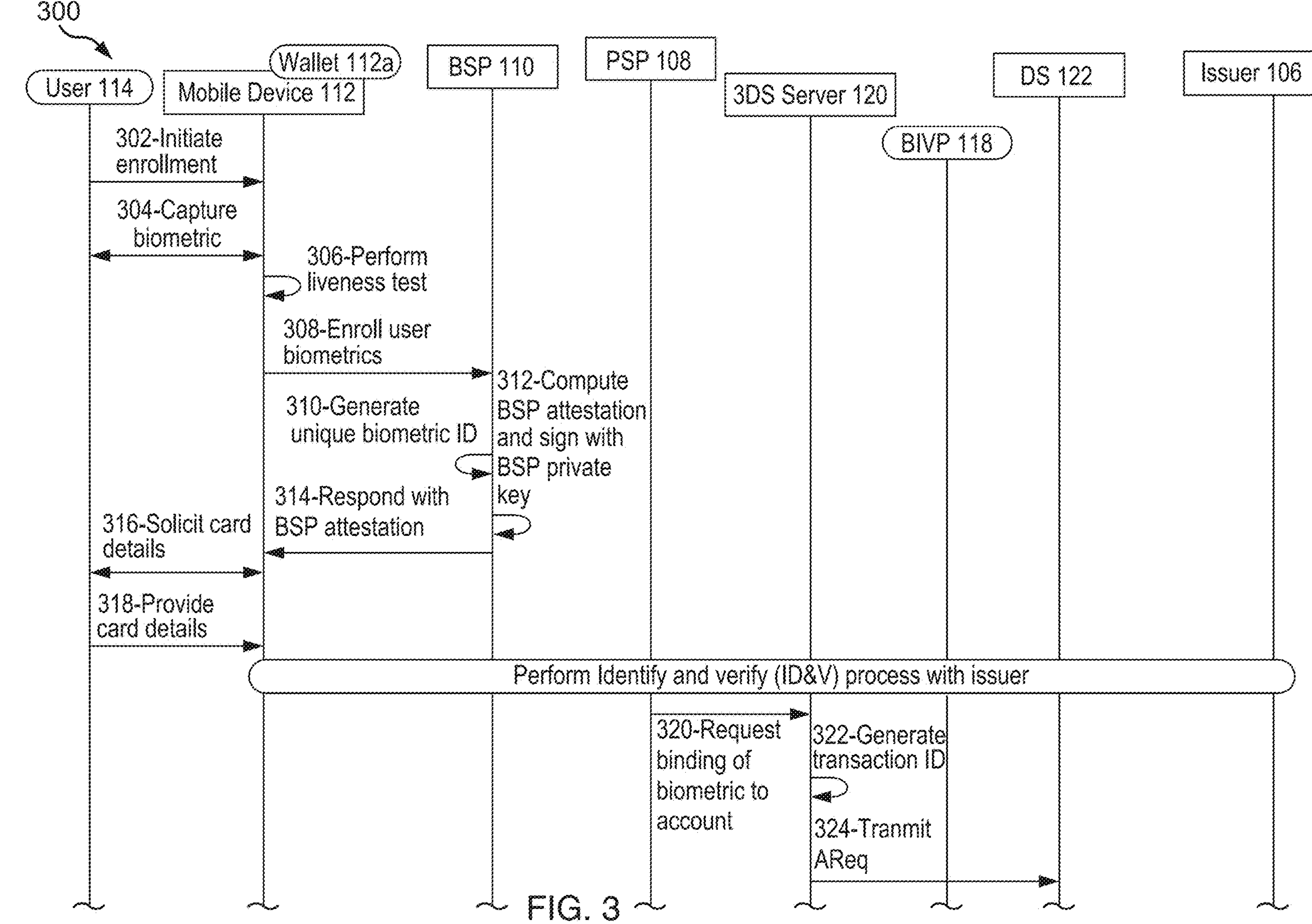
FIG. 3 is a flow diagram of an example method, which may be implemented in connection with the system of FIG. 1, for enrolling a user for biometric-initiated pay.
Figure 3:
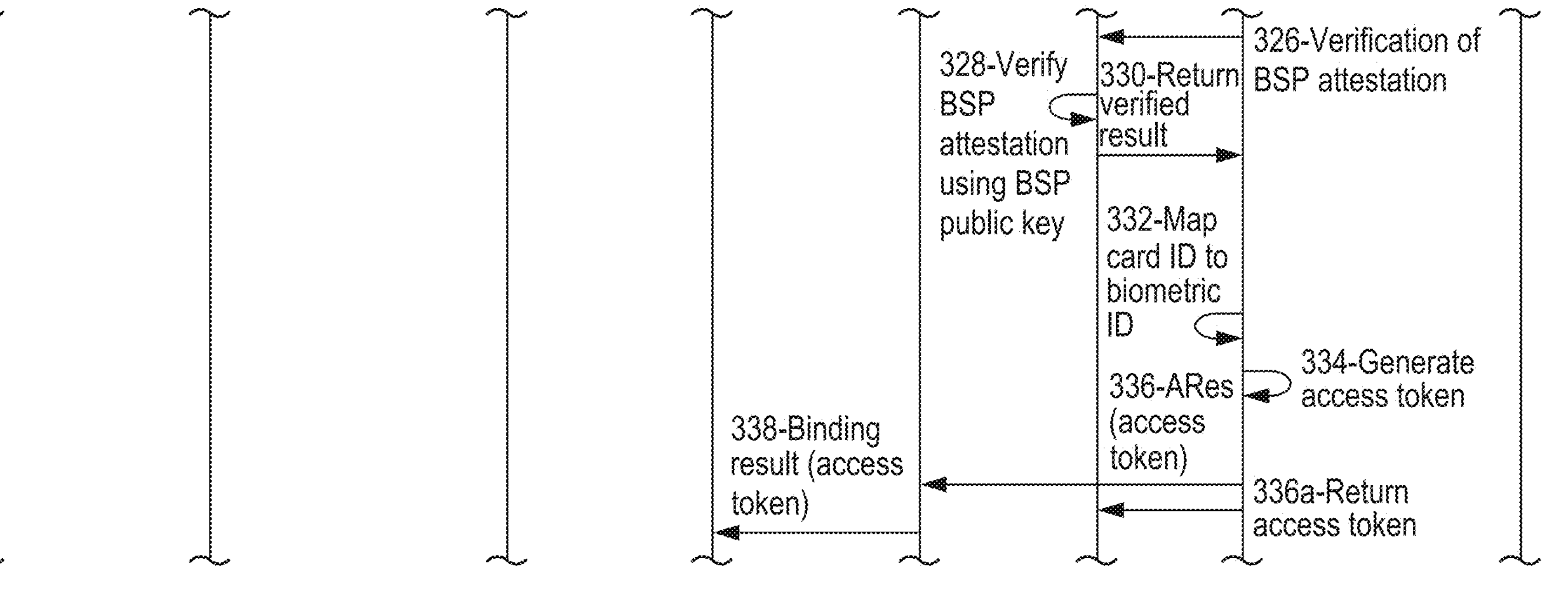
Figure 3:
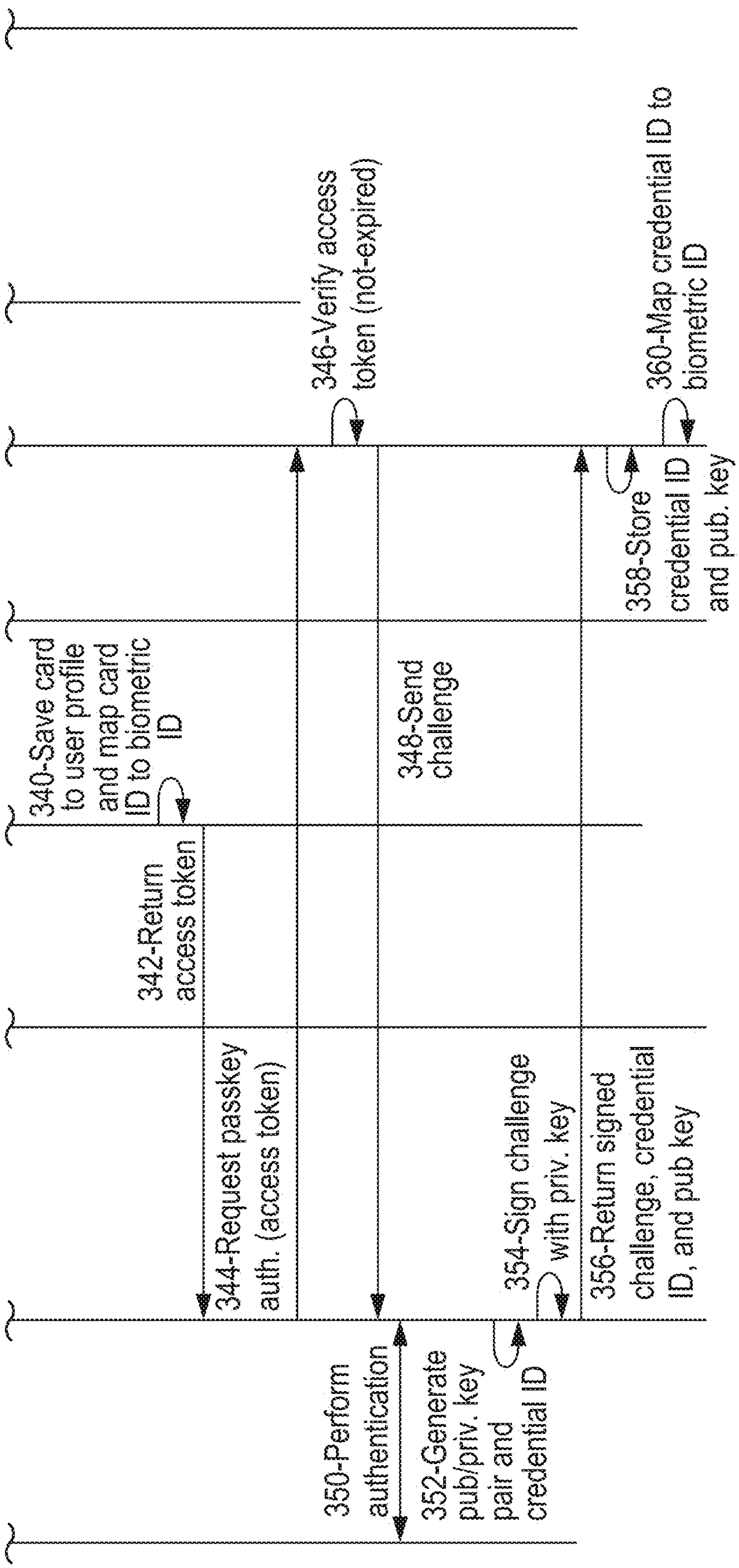

FIG. 3 illustrates an example method 300 for use in enrolling a user for biometric-initiated pay. The example method 300 is generally described in connection with the PSP 108, the BSP 110, the 3DS server 120, and the BIVP 118 of the system 100, and in conjunction with the other entities in FIG. 1. Reference is also made to the computing device 200 of FIG. 2. However, the methods herein should not be understood to be limited to the system 100 or the computing device 200, as the methods may be implemented in other systems and/or computing devices. Likewise, the systems and the computing devices herein should not be understood to be limited to the example method 300.

In describing the method 30, the device 112 is described as performing one or more steps, which should be understood to be based on the operation of the application 112*a*, or the operating system therein. By reference to the device 112 performing a step, it should be understood, therefore, that the step may be caused by the application 112*a*, or not.

At the outset, it should be appreciated that the user 114 has downloaded the application 112*a* to the device 112, and launched the application in the device 112. Thereafter, the user 114 decides to enroll for biometric-initiated pay, generally, whereby the user 114 initiates, at 302, an option presented by the application 112*a*, to enroll through the device 112, for biometric-initiate pay.

In response, at 304, the device 112 captures a biometric of the user 114, for example, via a biometric capturing device of the device 112, etc. That is, the device 112 may prompt the user 114 to present his/her face to a camera device (e.g., input device 208, etc.) of the device 112, or to place a finger/thumb on a fingerprint scanner device (e.g., input device 208, etc.) of the device 112, etc., whereby the device 112 captures the biometric. As part thereof, the device 112 performs, at 306, one or more quality checks, such as, for example, a liveness check (e.g., for a facial biometric, etc.), a size of the biometric, a clarity of the biometric, etc.

Based on the one or more quality checks being satisfied, the device 112 submits, at 308, the biometric to enroll the user's biometric to the BSP 110. Again, the biometric may include a facial image, fingerprint, palm print, or other suitable biometric, which may be raw data in some example, or a biometric template generated by the device 112, in other examples.

Upon receipt of the biometric, the BSP 110 may perform on or more quality checks on the biometric. At 310, the BSP 108 generates a unique biometric ID for the biometric (e.g., unique as to each other biometric known to the BSP 110, etc.), and stores the biometric (or a template thereof) in memory linked to the biometric ID. At 312, the BSP 108 computes an assertion for the biometric, which includes, among other things, the biometric ID, additional data related to the received biometric or user 114, and a BSP ID specific to the BSP 108. The assertion further includes a signature of the BSP 110. That is, the BSP 108 retrieves a private key from the secure location and signs the assertion therewith. The BSP 108 then responds, at 314, to the device 112 with the BSP assertion.

In turn, the device 112 solicits, at 316, an account to be associated with the biometric, to enable biometric-initiated pay to that account. In doing so, the device 112 may display different accounts already provisioned to the application 112*a* (e.g., as a listing of account in an interface, etc.), or permit the user 114 to enter a new account.

Regardless, in response, the user 114 provides, at 318, card details for the selected account, either by selecting the specific account, entering the detail, or tapping/dipping the physical card on the mobile device 112, etc.

Based thereon, as shown, the device 112 initiates an ID&V process between the illustrates entities.

In connection therewith, the device 112 submits an ID&V process request with the BSP assertion and the card details for the select account to the PSP 108. The PSP 108 then submits an authentication request, which is a non-payment or 3DS only request, to the 3DS server 120. The 3DS server 120 then initiates an authentication request (AReq) with the directory server 122, where the AReq includes, for example, a category 02 message, which is a challenge to the user 114, consistent with the EMV 3DS protocol. The directory server 122 forwards the AReq to the issuer 106 (or ACS thereof). The issuer 106 issues the authentication response (ARes) with an instruction for the challenge back, through the directory server 122 and the 3DS server 120, to the PSP 108. In response, the PSP 108 enables communication between the device 112 and the issuer 108, via the content of the ARes (e.g., URL, etc.). In connection therewith, the issuer 108 provides a OTP to the user 114, for example, via a text message or notification to the application 112*a*, whereupon the user 114 returns/responds to the same to verify the user 114 to the issuer 106. It should be appreciated that the challenge is sufficient to satisfy the issuer 106 that the user 114, associated with the appropriate identity, is the person requesting to enroll.

At that point, as part of the ID&V process, the issuer 108 provides a result of the challenge to the directory server 122, which provides the same to the 3DS server 120. The challenge result is associated with an ID&V Transaction ID specific to the ID&V process, for reference. The 3DS server caches the challenge result, and the PSP 108 requests the result, in response to which the 3DS server 120 provides the challenge result. In this example, the challenge result is a success. If otherwise, the method 300 ends, or alternative identity and verification process are employed.

With continued reference to FIG. 3, the PSP 108, based on the successful ID&V process, requests, at 320, the binding of the biometric to the selected account. In doing so, the PSP 108 includes the BSP assertion as the 3DS data only content of an authentication request to the 3DS server 120. The 3DS server 120 then initiates an authentication request (AReq), where the AReq includes, for example, a category 02 message, which includes a reference to the ID&V transaction ID, an indication of the binding request, the BSP assertion, and the timestamp of the successful ID&V process, where the message is consistent with the EMV 3DS protocol. The 3DS server 120 confirms that the timestamp of the ID&V process was successfully completed less than a threshold time (e.g., less than about five minutes, less than about ten minutes, less than about twenty minutes, or more or less, etc.). This check ties the ID&V process to the binding, and subsequent FIDO credential creation. If false/expired, the method ends. Conversely, if true, the 3DS server 120 proceeds to generate a DS transaction ID specific to the binding, at 322. At, 324, the 3DS server 120 then transmits the AReq, including the DS transaction ID and the BSP assertion, to the directory server 122.

In response, at 326, the directory server 122 submits the BSP assertion to the BIVP 118 for verification of the same. The BIVP 118, in turn, verifies the BSP assertion, at 328, by retrieving the public key for the BSP 108, based on the BSP ID and then verifying the signature on the BSP assertion, using the public key. When verified, the BIVP 118 returns, at 330, the verified result to the directory server 122.

Based thereon, the directory server 122 maps the card ID of the account selected by the user 114 to the biometric ID, at 332, thereby enabling the account for use through the biometric. In addition, the directory server 122 generates, at 334, a limited-time access token. The access token may expire, for example, in five minutes, ten minutes, or more or less, etc. The directory server 122 provides, at 336, the access token back to the device 112, as part of an authentication response (ARes) to the 3DS server 120, and also, at 336*a*, shares the access token with the BIVP 118.

The 3DS server 120 provides, at 338, a binding result back to the PSP 108. The binding result indicates that the binding is successful, and also includes the access token. At 340, the PSP 108 saves the card to the user profile specific to the user 114 and maps the card ID to the biometric ID. The PSP 108 returns the access token to the device 112, at 342.

In turn, the device 112 submits the access token, as part of a passkey authentication creation request to the BIVP 118, at 344. In doing so, the device 112 requests fast identity online (FIDO) authentication setup, in the absence of the issuer 106 being involved in a further ID&V process for the user 114, as described above. At 346, the BIVP 118 verifies that the access token is unexpired and, when the access token is unexpired, sends, at 348, a challenge to the device 112. The challenge is provided with the biometric ID, the card ID for the selected card, and the ID&V transaction ID (to identify and leverage the previous ID&V process completed above) and the DS transaction ID, as a record of the basis for the passkey authentication.

The device 112 verifies the challenge (e.g., verifies the card ID matches a selected account, for example) and then performs authentication, at 350, as explained above, of the user 114. At 352, the device 112 generates a device private-public key pair and a credential ID. The device 112 stores the private key in a secure location in the device 112, linked to the credential ID, and also stores the identifiers received with the challenge in connection therewith. The device 112 then signs, at 354, the challenge with the private key. The device 112 returns, at 356, the signed challenge, the credential ID and the public key to the BIVP 118.

The BIVP 118 stores the credential ID and the public key in memory, at 358, and further maps the credential ID to the biometric ID, at 360.

In this manner, the user 114 is enrolled for biometric pay, and also the device 112 is enabled to passkey authentication of the user 114.

Figure 4:
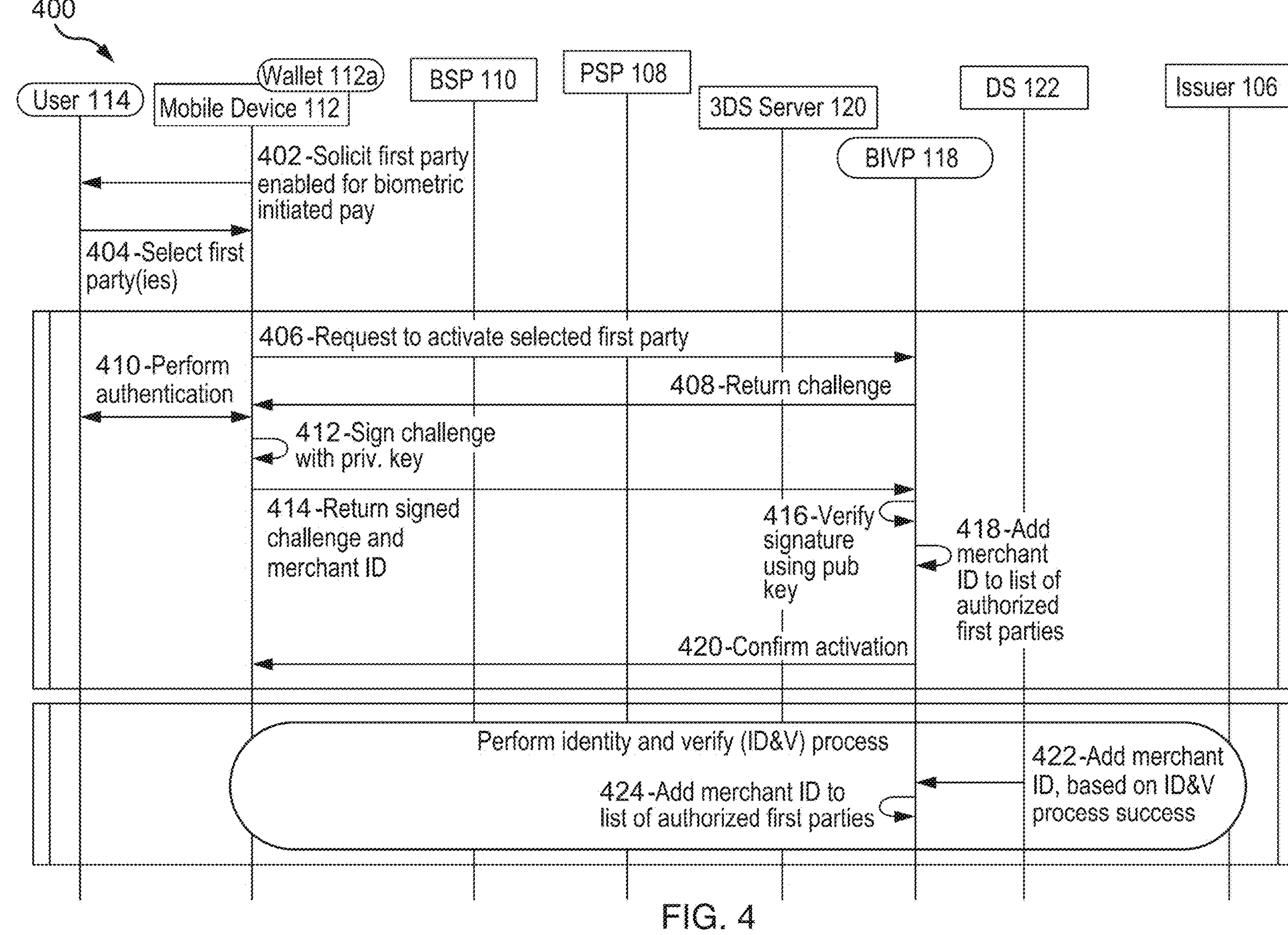
FIG. 4 is a flow diagram of an example method, which may be implemented in connection with the system of FIG. 1, for extending biometric-initiated pay to one or more first parties.

FIG. 4 illustrates an example method 400 for use in extending biometric-initiated pay to one or more first parties. The example method 400 is generally described in connection with the PSP 108, the BSP 110, the 3DS server 120, and the BIVP 118 of the system 100, and in conjunction with the other entities in FIG. 1. Reference is also made to the computing device 200 of FIG. 2. However, the methods herein should not be understood to be limited to the system 100 or the computing device 200, as the methods may be implemented in other systems and/or computing devices. Likewise, the systems and the computing devices herein should not be understood to be limited to the example method 400.

In this example embodiment, the device 112 further permits the user 114 to associate the biometric-initiated pay to one or more first parties, through use of the passkey authentication. That is, the user 114 may access the application 112*a*, which solicits, at 402, the selection of one or more first parties to enable for biometric-initiated pay. At 404, in response, the user 114 selects the first party 102.

In a first implementation option, where the device is enabled for passkey authentication with the BIVP 118, the device 112 submits, at 406, a request to activate the first party 102 for biometric-initiated pay to a list if authorized first parties to the BIVP 118. The request includes card details for the account and the merchant ID for the first party 102.

In response, at 408, the BIVP 118 returns a passkey challenge to the user 114, at the device 112. The device 112, upon receipt, authenticates the user 114, at 410 (e.g., via biometric authentication, etc.). That is, the user 114 presents a biometric, and the device 112 captures the biometric and compares the same to a biometric reference included in or accessible to the device 112. When there is a match, the user 114 is authenticated.

At 412, the device 112 retrieves the private key and signs the challenge with the private key. At 414, the device 112 returns the signed challenge, along with the merchant ID to the BIVP 118. At 416, the BIVP 118 verifies the signature, with the public key previously received from the device 112. When the signature is verified, at 418, the BIVP 118 adds the merchant ID of the first party 102 to a list of authorized first parties for the device 112 and/or the user 114.

The BIVP 118 confirms, at 420, the addition of the first party 102 to the list of authorized first parties for biometric-initiated transactions.

Based on the above, the first parties approved for biometric-initiated pay are included in the list of authorized first parties, by merchant ID, for the user 114. In this embodiment, the biometric-initiated pay is associated with the account selected above, in FIG. 3, whereby the enrolled biometric continues to be linked to the selected account for the one or more first parties, through leveraging the passkey authentication in lieu of further ID&V processes per first party.

In a second implementation option, as shown in FIG. 4, the device 112 is not enabled for passkey authentication. As such, the device 112 initiates, through the PSP 108 and the issuer 106, as explained above, an ID&V process. As part thereof, the directory server 112 receives the result from the issuer 108 and, based thereon, instructs the BIVP 118 to add, at 422, the merchant ID for the first party 102 to the list of authorized first parties for the device 112 and/or the user 114 based on the successful process. In turn, at 424, the BIVP 118 adds the merchant ID to the list of authorized first parties.

Figure 5:
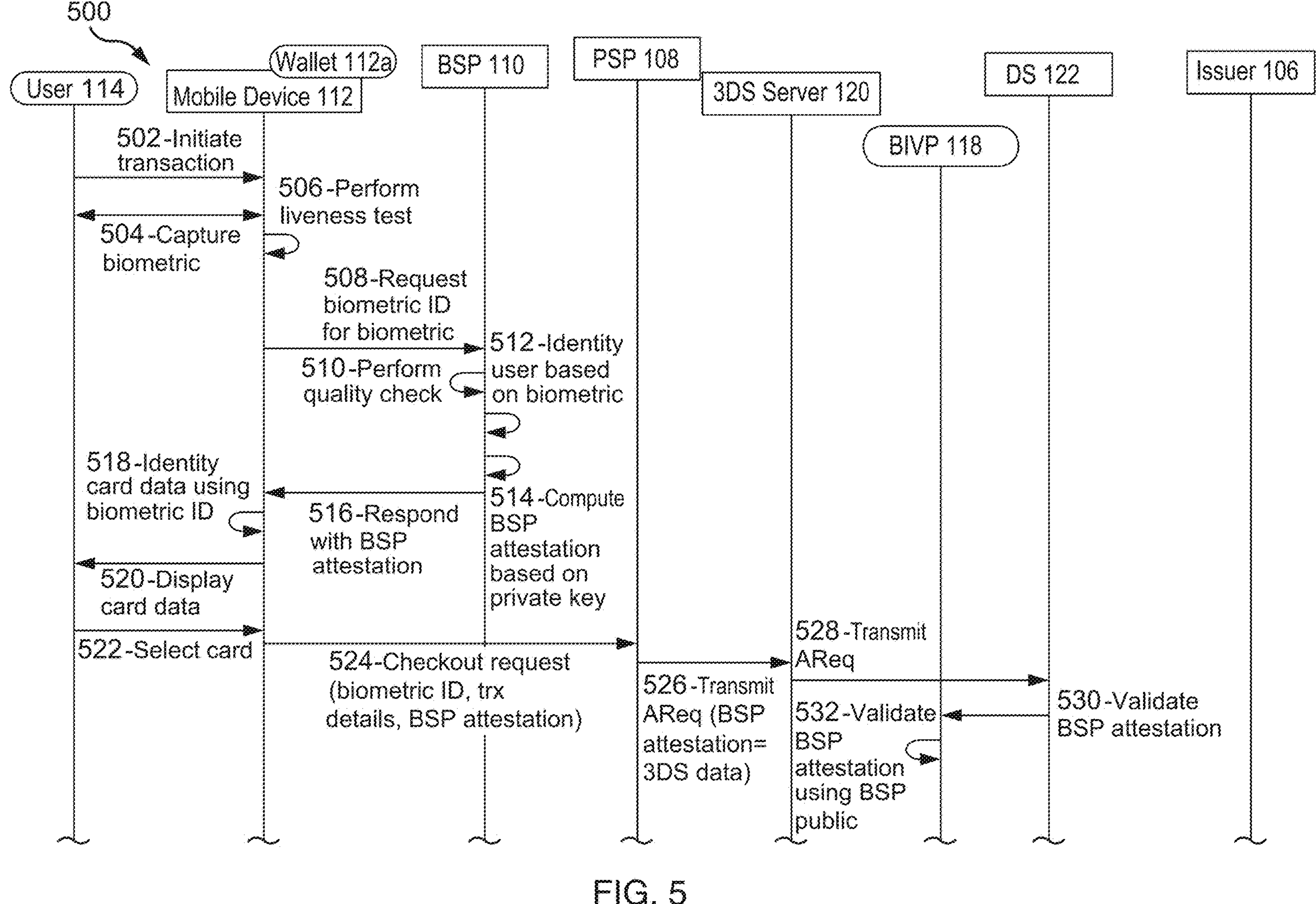
FIG. 5 is a flow diagram of an example method, which may be implemented in connection with the system of FIG. 1, for implementing biometric-initiated pay for a transaction.
Figure 5:
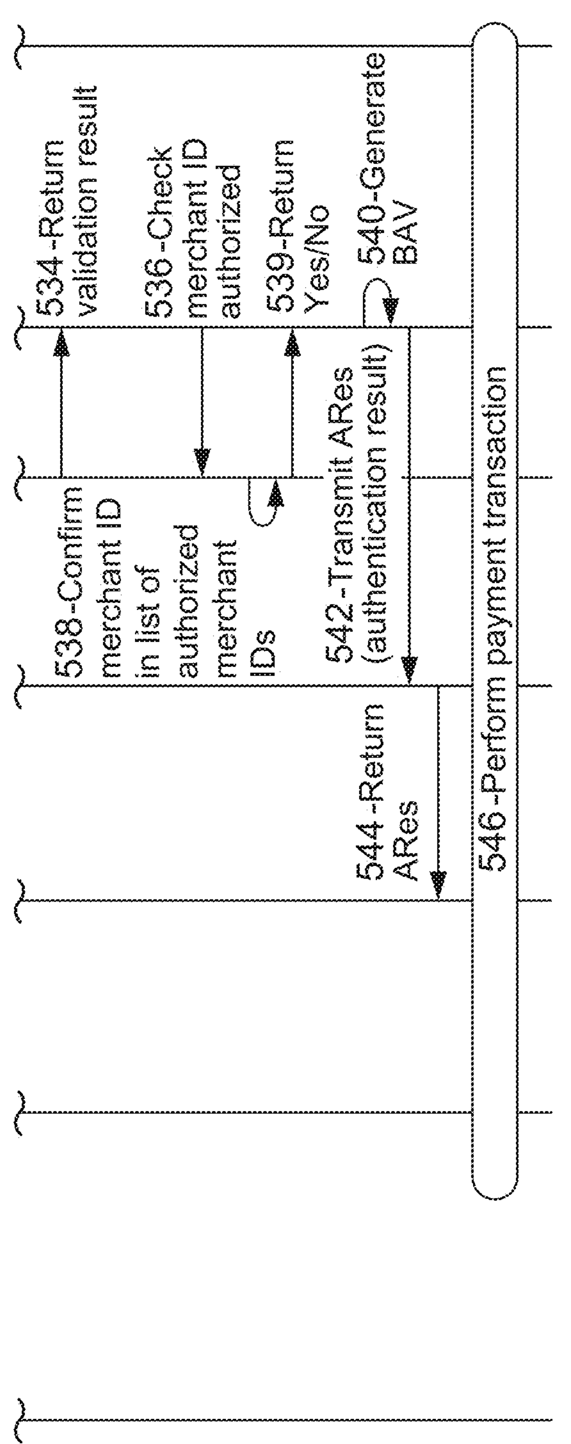

FIG. 5 illustrates an example method 500 for use in initiating biometric-initiated pay for a transaction. The example method 500 is generally described in connection with the PSP 108, the BSP 110, the 3DS server 120, and the BIVP 118 of the system 100, and in conjunction with the other entities in FIG. 1. Reference is also made to the computing device 200 of FIG. 2. However, the methods herein should not be understood to be limited to the system 100 or the computing device 200, as the methods may be implemented in other systems and/or computing devices. Likewise, the systems and the computing devices herein should not be understood to be limited to the example method 500.

In connection with a biometric-initiated pay interaction at the first party 102, the user 114 collects one or more products for purchase, which are scanned at a POS terminal 116, either at a fixed location, or as the user 114 shops in the store. As part of the purchase process, the user 114 initiates, at 502, a biometric-initiated pay transaction for the purchase of the one or more products. In doing so, the user 114 may actively select the option to pay in this manner, or simply, in some implementations, move toward an exit of the first party 102.

In response, at 504, the first party 102 captures a biometric of the user 114, for example, via the POS terminal 116, or other suitable biometric capturing device, etc. In connection therewith, the first party 102 perform, at 506, one or more quality checks, such as, for example, a liveness test as the biometric is captured, etc. Upon successful quality check(s), the first party 102 requests, at 508, from the BSP 110, a biometric ID for the biometric.

The BSP 110, at 510, performs one or more quality checks on the biometric template, as describe above. Upon successful quality check(s), the BSP 110 identifies the user 114, at 512, based on the biometric matching a biometric reference stored therein. In doing so, the BSP 110 also identifies the biometric ID of the suer 114, which is linked to the biometric reference. Further, the BSP 110 computes, at 514, a BSP assertion for the transaction. The BSP assertion includes the biometric ID, other suitable data, and also a signature based on the private key of the BSP 110. Again, the suitable data may include, without limitation, a biometric modality (e.g., palm, face, iris, etc.), a BSP ID, a wallet ID, a biometric enrollment timestamp (Epoch), a BSP transaction ID, a certification ID, and a compliance ID, etc. At 516, the BSP 110 responds with the BSP assertion to the first party 102.

It should be understood that where the quality check(s) or matching fail, the BSP 110 may request that the biometric capture be repeated.

Upon receipt of the BSP assertion, the first party 102 identifies, at 518, the card data associated with the biometric ID. This may include only one account, or multiple accounts. The first party 102 further displays, at 520, the card data to the user 114, at the POS terminal 116, with the option to either select an account and/or provide consent to the biometric-initiated transaction. In response, the user 114 selects a card (or account), or provides consent, at 522, whereupon, the first party 102 submits, at 524, a checkout request to the PSP 108. The checkout request include the biometric ID, the transaction details, and the BSP assertion. The transaction details generally include the amount of the transaction, the merchant ID, the time/date, first party name and address, currency code, transaction ID, account data for the selected card, merchant category code (MCC), etc.

The PSP 108 transmits, at 526, a payment authentication request to the 3DS server 120. The authentication request includes, among other things, the account details and the BSP assertion (as the 3DS data for the same), etc. The 3DS server 120, in turn, transmits, at 528, a payment authentication request (AReq) to the directory server 122. The AReq includes, for example, a category 01 message, which includes the BSP assertion and other transaction details (e.g., merchant ID, etc.), where the message is consistent with the EMV 3DS protocol. The AReq is designated not flow to the issuer 108 (e.g., generateCReq=False, etc.).

The directory server 122 submit, at 530, the BSP assertion to the BIVP 118 for validation. The BVIP 118, in turn, validates, at 532, the signature on the BSP assertion using the public key previously received from the BSP 110 (e.g., as identified by the BSP ID, etc.). Once verified, the BVIP 118 returns, at 534, a validation result for the BSP assertion, which is a success in this example. As shown, at 536, the directory server 122 then checks that the merchant ID of the first party 102 is authorized for biometric-initiated pay with the BIVP 118. In response, the BIVP 118 confirms, at 538, whether the merchant ID of the first party 102, as included in the AReq, is included, or not, in the list of authorized first parties. When the merchant ID is included, the BIVP 118 returns, at 539, an affirmative or Yes response to the directory server 122 (or conversely a negative or No response when the merchant ID is not included).

With the verification of the BSP assertion and the first party 102 being authorized, the directory server 122 generates a biometric authentication value, or BAV, at 540, where the BAV is an indication of the successful biometric authentication of the user 114. The directory server 112 transmits the BAV along with other details of the transaction, as an authentication response (ARes) to the 3DS server 120, at 542. The 3DS server 120 returns the ARes to the PSP 108, at 544.

Based thereon, the PSP 108 is permitted to pursue authorization of the transaction, at 546, which generally includes an authorization request message (e.g., consistent with ISO 8583, or ISO 2022, etc.) transmitted from the PSP 108 to the issuer 106, via the processing network 104. The message includes the BAV value, which is verified during the authorization process. Once the transaction is authorized, the issuer 106 is configured to compile and transmit an authorization response for the interaction back to the PSP 108, through the processing network 104. The PSP 108, upon authorization in the authorization response, notifies the first party 102 that the interaction is authorized. The first party 102 then proceeds to deliver the one or more product to the user 114 and/or simply permit the user 114 to exist the first party 102, etc.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, from a directory server, a biometric service provider (BSP) assertion having a signature computed by using a private key of a BSP, the BSP assertion including a biometric ID of a user; (b) verifying the signature of the BSP assertion, using a public key specific to the BSP, previously shared with the computing device; (c) returning a verification result to the directory server; (d) based on the verification result, receiving an access token; (c) receiving an authentication creation request, from a device specific to the user, in lieu of the issuer of the account, the fast identity online (FIDO) authentication creation request including the access token; (f) determining that the access token is unexpired; (g) providing a challenge to the device, in response to the authentication creation request; (h) receiving, from the device specific to the user, a signed challenge, a credential ID, and a FIDO public key specific to the device; (i) storing the FIDO public key specific to the device in association with the credential ID; and/or (j) mapping the credential ID to the biometric ID of the user, whereby the device is enabled for FIDO authentication in connection with the biometric ID.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art, that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for facilitating network interactions based on user biometrics, the method comprising:

receiving, by a computing device, from a directory server, a biometric service provider (BSP) assertion having a signature computed by using a private key of a BSP, the BSP assertion including a biometric ID of a user;

verifying, by the computing device, the signature of the BSP assertion, using a public key specific to the BSP, previously shared with the computing device;

returning, by the computing device, a verification result to the directory server;

based on the verification result, receiving, by the computing device, an access token; and then, receiving, by the computing device, a fast identity online (FIDO) authentication creation request, from a device specific to the user, in lieu of receiving the FIDO authentication creation request from an issuer of an account of the user, the FIDO authentication creation request including the access token;

determining, by the computing device, that the access token is unexpired;

providing, by the computing device, a challenge to the device, in response to the authentication creation request;

receiving, by the computing device, from the device specific to the user, a signed challenge, a credential ID, and a FIDO public key specific to the device;

storing, by the computing device, the FIDO public key specific to the device in association with the credential ID; and mapping, by the computing device, the credential ID to the biometric ID of the user, whereby the device is enabled for FIDO authentication in connection with the biometric ID.

2. The computer-implemented method of claim 1, wherein the computing device is a computing device of a biometric identification verification platform; and wherein the directory server is part of an EMV enhanced authentication scheme.

3. The computer-implement method of claim 1, wherein the BSP assertion includes a BSP identifier (ID) for the BSP; and Wherein the method further comprises retrieving the public key specific to the BSP, based on the BSP ID.

4. The computer-implemented method of claim 1, further comprising:

generating, by the directory server, the access token, based on the verification result; and transmitting the access token to the computing device.

5. The computer-implemented method of claim 1, further comprising:

verifying, by a 3DS server, a timestamp on a successful identify and verification (ID&V) transaction being within a threshold time;

in response to verification of the ID&V transaction being successful within the threshold time, generating a transaction ID and transmitting the transaction ID and the BSP assertion, as part of an authentication request, to the directory server; and transmitting, by the directory server, the BSP assertion to the computing device, in response to the authentication request.

6. The computer-implement method of claim 1, further comprising:

receiving, by the computing device, from the device specific to the user, a request to authorize a first party for biometric-initiated pay through the biometric ID, the first party associated with a unique identifier;

returning, by the computing device, a second challenge to the device specific to the user;

receiving, by the computing device, a second challenge from the device specific to the user, which is signed by a FIDO private key specific to said device;

verifying, by the computing device, the second challenge using the FIDO public key specific to the device; and in response to verification of the signed challenge, adding, by the computing device, the unique identifier to a list of authorized first parties for biometric-initiated pay for the user.

7. The computer-implement method of claim 6, wherein receiving the signed challenge includes receiving the credential ID from the device specific to the user; and further comprising retrieving the public key specific to the device based on the credential ID.

8. The computer-implemented method of claim 6, further comprising receiving, by the computing device, from the device specific to the user, a second request to authorize a further first party for the biometric-initiated pay through the biometric ID, the further first party associated with a second unique identifier;

returning, by the computing device, a third challenge to the device specific to the user;

receiving, by the computing device, a third challenge from the device specific to the user, which is signed by the FIDO private key specific to said device;

verifying, by the computing device, the third challenge using the FIDO public key specific to the device; and in response to verification of the signed challenge, adding, by the computing device, the second unique identifier of the further first party to the list of authorized first parties for biometric-initiated pay.

9. The computer-implement method of claim 1, further comprising:

receiving, by the computing device, from the directory server, a second BSP assertion having a second signature by the private key of the BSP;

verifying, by the computing device, the second signature of the second BSP assertion, using the public key specific to the BSP;

returning, by the computing device, a verification result to the directory server;

receiving, by a computing device, from the directory server, a check request for a unique identifier for the second BSP assertion;

verifying, by the computing device, the unique identifier for the second BSP assertion is included in a list of authorized first parties for the user; and returning, by the computing device, an affirmative response to the check request, in response to the unique identifier being included in the list of authorized first parties.

10. A system for facilitating network interactions based on user biometrics, the system comprising:

a biometric identification verification platform (BIVP) computing device, which is configured, by executable instructions, to:

receive, from a directory server, a biometric service provider (BSP) assertion having a signature computed by using a private key of a BSP, the BSP assertion including a biometric ID of a user;

verify the signature of the BSP assertion, using a public key specific to the BSP, previously shared with the computing device;

return a verification result to the directory server;

based on the verification result, receive an access token from the directory server; and then, receive a fast identity online (FIDO) authentication creation request from a device specific to the user, the FIDO authentication creation request including the access token;

determine that the access token is unexpired;

provide a challenge to the device specific to the user, in response to the authentication creation request and the access token being unexpired;

receive, from the device specific to the user, a signed challenge, a credential ID, and a FIDO public key specific to said device;

store the FIDO public key specific to the device in association with the credential ID; and map the credential ID to the biometric ID of the user; and enable, based on the credential ID being mapped to the biometric ID, the device specific to the user for FIDO authentication in connection with the biometric ID.

11. The system of claim 10, wherein the assertion includes a BSP identifier (ID) for the BSP; and wherein the BIVP computing device is configured, by the executable instructions, to retrieve the public key specific to the BSP, based on the BSP ID.

12. The system of claim 10, further comprising the directory server, which is configured by second executable instructions, to:

generate an access token, based on the verification result; and transmit the access token to the BIVP computing device.

13. The system of claim 10, further comprising a 3DS server, which is configured by third executable instructions, to:

verify a timestamp on an identify and verification (ID&V) transaction, which is successful within a threshold time; and in response to verification of the ID&V transaction being successful within the threshold time, generate a transaction ID and transmit the transaction ID and the BSP assertion, as part of an authentication request, to the directory server; and wherein the directory server is configured to transmit the BSP assertion to the BIVP computing device, in response to the authentication request.

14. The system of claim 10, wherein the BIVP computing device is further configured, by the executable instructions, to:

receive, from the device specific to the user, a request to authorize a first party for biometric-initiated pay through the biometric ID, the first party associated with a unique identifier;

return a second challenge to the device specific to the user;

receive a second challenge from the device specific to the user, which is signed by a FIDO private key specific to said device;

verify the second challenge using the FIDO public key specific to the device; and in response to verification of the signed challenge, add the unique identifier to a list of authorized first parties for biometric-initiated pay for the user.

15. The system of claim 14, wherein the BIVP computing device is further configured, by the executable instructions, to:

receive the credential ID along with the second challenge from the device specific to the user; and retrieve the public key specific to said device based on the credential ID.

16. The system of claim 14, wherein the BIVP computing device is further configured, by the executable instructions, to:

receive, from the device specific to the user, a second request to authorize a further first party for the biometric-initiated pay through the biometric ID, the further first party associated with a second unique identifier;

return a third challenge to the device specific to the user;

receive a third challenge from the device specific to the user, which is signed by the FIDO private key specific to said device verify the third challenge using the FIDO public key specific to said device; and in response to verification of the signed challenge, add the second unique identifier of the further first party to the list of authorized first parties for biometric-initiated pay.

17. The system of claim 10, wherein the BIVP computing device is further configured, by the executable instructions, to:

receive, from the directory server, a second BSP assertion having a second signature by a private key of a BSP;

verify the second signature of the second BSP assertion, using the public key specific to the BSP;

return a verification result to the directory server;

receive, from the directory server, a check request for a unique identifier for the second BSP assertion;

verify the unique identifier for the second BSP assertion is included in a list of authorized first parties for the user; and return an affirmative response to the check request, in response to the unique identifier being included in the list of authorized first parties.

18. A non-transitory computer-readable storage medium including executable instructions for use in facilitating network interactions based on user biometrics, which, when executed by at least one processor, cause the at least one processor to:

receive, from a directory server, a biometric service provider (BSP) assertion having a signature computed by using a private key of a BSP, the BSP assertion including a biometric ID of a user;

verify the signature of the BSP assertion, using a public key specific to the BSP, previously shared with the at least one processor;

return a verification result to the directory server;

based on the verification result, receive an access token from the directory server; and then, receive a fast identity online (FIDO) authentication creation request from a device specific to the user, in lieu of receiving the FIDO authentication creation request from an issuer of an account of the user, the FIDO authentication creation request including the access token;

determine that the access token is unexpired;

provide a challenge to the device specific to the user, in response to the authentication creation request and the access token being unexpired;

receive, from the device specific to the user, a signed challenge, a credential ID, and a FIDO public key specific to said device;

store the FIDO public key specific to the device in association with the credential ID; and map the credential ID to the biometric ID of the user, whereby the device specific to the user is enabled for FIDO authentication in connection with the biometric ID.

19. The non-transitory computer-readable storage medium of claim 18, wherein the BSP assertion includes a BSP identifier (ID) for the BSP; and wherein the executable instructions, when executed by the at least one processor, further cause the at least one processor to retrieve the public key specific to the BSP, based on the BSP ID.

20. The non-transitory computer-readable storage medium of claim 18, wherein the executable instructions, when executed by the at least one processor, further cause the at least one processor to:

receive, from the device specific to the user, a request to authorize a first party for biometric-initiated pay through the biometric ID, the first party associated with a unique identifier;

return a second challenge to the device specific to the user;

receive a second challenge from the device specific to the user, which is signed by a FIDO private key specific to said device;

verify the second challenge using the FIDO public key specific to the device; and in response to verification of the signed challenge, add the unique identifier to a list of authorized first parties for biometric-initiated pay for the user.

* * * * *